R. S. Hadley,
Water Wheel.

Nº 44,088.            Patented Sep. 6, 1864.

Witnesses            Inventor

J W Coombs          R S Hadley
G W Reed            per Munn & Co Attys

UNITED STATES PATENT OFFICE.

R. S. HADLEY, OF ANAMOSA, IOWA.

IMPROVEMENT IN WATER-WHEELS.

Specification forming part of Letters Patent No. 44,088, dated September 8, 1864.

*To all whom it may concern:*

Be it known that I, R. S. HADLEY, of Anamosa, in the county of Jones and State of Iowa, have invented a new and Improved Water-Wheel; and I do hereby declare that the following is a full, clear, and exact description of the same, reference being had to the accompanying drawings, making a part of this specification, in which—

Figure 1:
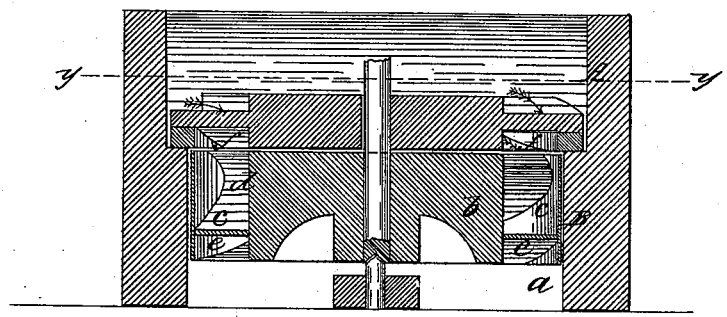
Figure 2:
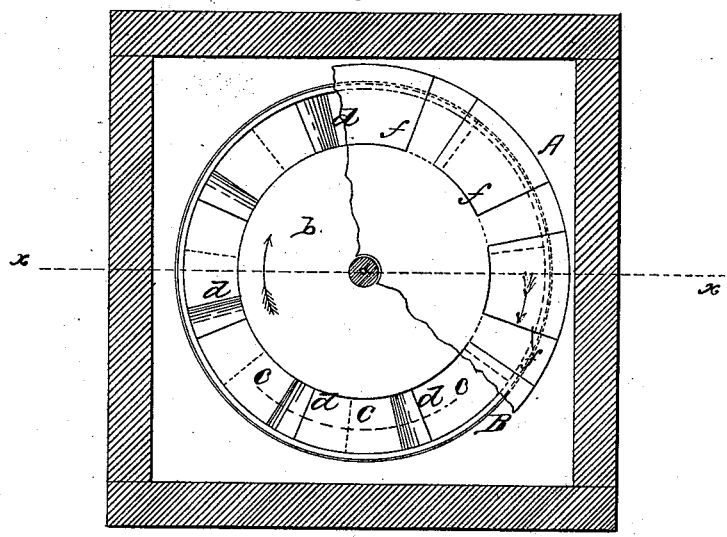
Figure 3:
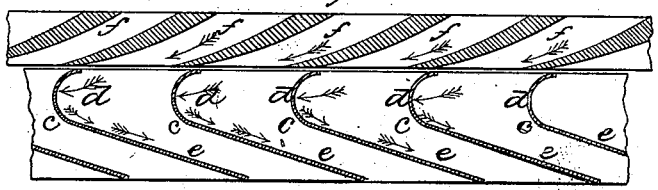

Figure 1 is a vertical section of my invention taken in the line $x\ x$, Fig. 2; Fig. 2, a horizontal section of the same taken in the line $y\ y$, Fig. 1; Fig. 3, an enlarged side sectional view of the same taken in the line $z\ z$, Fig. 2.

Similar letters of reference indicate corresponding parts in the several figures.

This invention consists in constructing the buckets of the wheel in such a manner that the faces will have a semicircular, concave, and a plane surface, the former being at the upper and the latter at the lower part of the buckets, and in using in connection with said buckets a band which incloses them.

The invention also consists in the employment or use of chutes placed in such relation with the buckets of the wheel as to cause the water to act upon the buckets in the most favorable manner to obtain a large percentage of the power of the former.

To enable those skilled in the art to fully understand and construct my invention, I will proceed to describe it.

A represents a penstock, in which the wheel is placed, the latter being in a circular opening, $a$, in the bottom of the penstock. The wheel is composed of a cylindrical hub, $b$, having buckets $c$ attached to its periphery. These buckets are of semicircular form at their upper parts, as shown at $d$, and their lower parts, $e$, are inclined planes, as shown clearly in Fig. 3. The lower parts, $e$, of the buckets overlap each other, and their length is equal to about once and a half of the space between the upper parts, $d$, of the buckets, and the space between the parts $e$ is sufficiently wide to admit of a free escape of the water.

The water first acts directly against the upper parts, $d$, of the buckets at their concave sides, and then, without being broken, descends upon the lower inclined parts, $e$. These unbroken sheets or columns of water in passing down the inclined surfaces of the lower parts, $e$, of the buckets, act in two ways to render the wheel efficient. In the first place, they prevent the water from rebounding too quickly from the upper parts, $d$, of the buckets, and, in the second place, they are acted upon by the gravity of the water as it passes down them, thus adding the power of the gravity of the water to that of impact.

The buckets $c$ are inclosed by a band, B, which may extend their whole height, as shown in Fig. 1.

Over the wheel there are placed a series of chutes, $f$. One over each bucket, or less, may be used. These chutes are inclined so as to conduct the water at right angles to the upper parts, $d$, of the buckets. The chutes are slightly curved longitudinally, and are gradually contracted from their upper to their lower ends, as shown clearly in Fig. 3.

Having thus described my invention, what I claim as new, and desire to secure by Letters Patent, is—

1. The buckets $c$, so formed or shaped as to have an upper semicircular part, $d$, and a lower inclined plane surface, $e$, in connection with a band, B, encompassing the whole, as set forth.

2. The combination of the longitudinally curved and inclined chutes $f$, semicircular upper parts, $d$, and inclined-plane parts $e$ of the buckets $c$, and inclosing-band, B, all constructed, arranged, and employed as herein specified.

R. S. HADLEY.

Witnesses:
 JACOB C. DIETZ,
 WM. G. HAMMOND.